United States Patent
Hawkins

Patent Number: 5,971,444
Date of Patent: Oct. 26, 1999

[54] THROUGH WALL CONNECTOR

[75] Inventor: Brent C. Hawkins, Flushing, Mich.

[73] Assignee: World Fitting, L.L.C., Flushing, Mich.

[21] Appl. No.: 08/880,487

[22] Filed: Jun. 23, 1997

Related U.S. Application Data

[60] Provisional application No. 60/020,351, Jun. 24, 1996.

[51] Int. Cl.$^6$ ....................................................... F16L 5/08
[52] U.S. Cl. ...................... 285/206; 285/201; 285/139.2; 285/211
[58] Field of Search ..................... 285/201, 205, 285/206, 139.1, 139.2, 211, FOR 143

[56] References Cited

U.S. PATENT DOCUMENTS

| | | | |
|---|---|---|---|
| 1,755,104 | 4/1930 | Deierlein | 285/139.2 |
| 3,104,120 | 9/1963 | Myers | 285/161 |
| 3,181,899 | 5/1965 | McKnight | 285/139.2 |
| 3,531,142 | 9/1970 | Peasley | 285/39 |
| 3,643,987 | 2/1972 | DuPont | 285/205 |
| 4,165,893 | 8/1979 | Fields | 285/139.1 |
| 4,492,392 | 1/1985 | Woods et al. | 285/119 |
| 4,613,169 | 9/1986 | Engelhart | 285/161 |
| 4,623,173 | 11/1986 | Handa et al. | 285/333 |
| 4,637,638 | 1/1987 | Rush et al. | 285/206 X |
| 5,509,240 | 4/1996 | Barton | 52/220.8 |

FOREIGN PATENT DOCUMENTS 504685  9/1992  European Pat. Off. ...... 285/FOR 143

*Primary Examiner*—Anthony Knight
*Attorney, Agent, or Firm*—Howard & Howard

[57] ABSTRACT

A through wall connector assembly which provides a substantially water-tight and air-tight seal around the circumference of an opening in a wall to allow for sealed extension of a line through the opening in the wall. The assembly includes a male member adapted to extend through the opening in the wall. The male member receives a first section and a second section of the line to be extended through the wall. A female member is attached to the male member to secure the male member and the female member in the wall. A first seal is positioned adjacent the male member on one side of the wall and a second seal is positioned adjacent the female member on the opposite side of the wall to prevent the ingress of air, moisture and water through the opening in the wall.

19 Claims, 2 Drawing Sheets

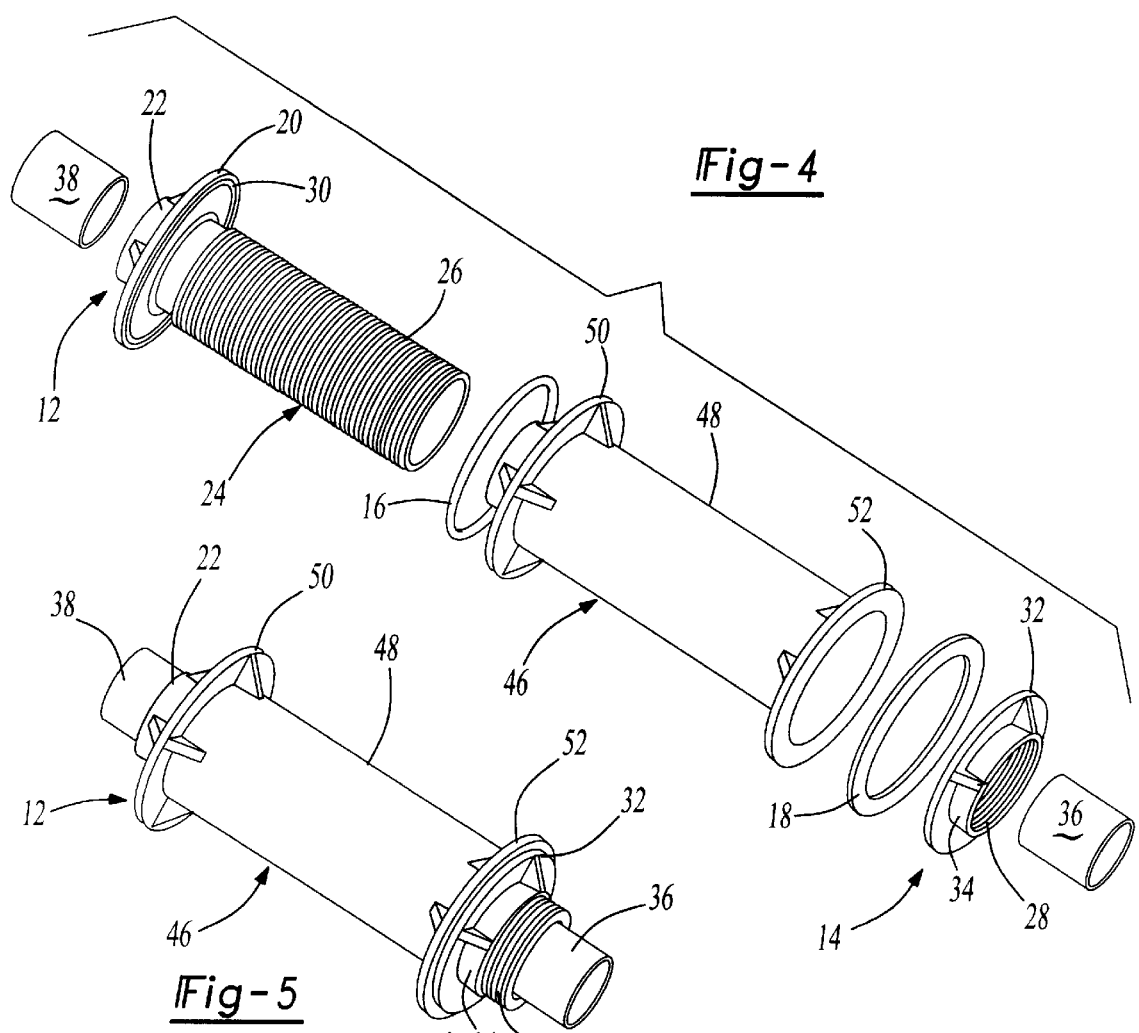
Fig-4
Fig-5
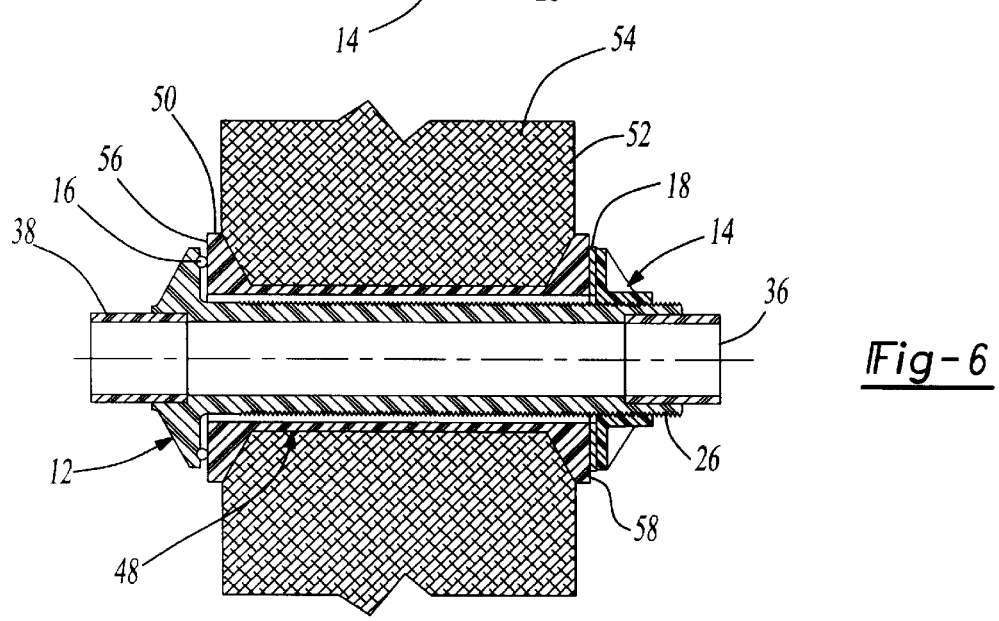
Fig-6

THROUGH WALL CONNECTOR

This application claims the benefit of U.S. Provisional Application No. 60\020,351, filed Jun. 24, 1996.

BACKGROUND OF THE INVENTION

The present invention relates to connectors and, more particularly, to a through wall connector assembly that provides a substantially water-tight and air-tight connection through a wall.

It is often necessary to extend lines such as water, sewer and electrical conduit lines through the walls of a building and, in particular, basement walls or the structural wall just above the basement or foundation. A great deal of labor and expense is directed toward keeping the walls impervious to moisture and to reduce or prevent air infiltration. To accomplish this goal, the walls are normally covered with a vapor barrier and in the example of a basement wall, backfilled to direct water away from the basement wall. Additionally, drainage pipes, such as field tiles, are sometimes used to keep water away from basement walls. Special care is also taken to prevent unnecessary openings in the walls and to keep any necessary openings to a minimum.

Because of the need to extend water, sewer and electrical conduit lines into buildings, openings in the walls are required and these openings result in the possibility of ingress of moisture, outside air, and sometimes water. The openings are cut into the wood wall above the foundation or basement or into the basement wall. In poured concrete walls the openings are often made as the wall is being poured. The openings by necessity must be slightly larger than the line being extended through the opening. Many times, little care is taken in making the openings and this results in fairly large to gaping openings in the walls. Previous attempts to seal the excess space in the openings have not been entirely successful.

SUMMARY OF THE INVENTION

The present invention is a through wall connector assembly for providing a substantially water-tight and air-tight seal around the circumference of an opening in a wall to allow for extension of a line through the opening in the wall. The assembly includes a male member adapted to extend through the opening in the wall. The male member receives the sections of for example a pipe or other conduit to be extended through the wall. These sections contain the electric cable or other line being inserted through the wall. A female member having threads, tabs or other means secures the male member and the female member to the wall. A first seal adjacent the male member and a second seal adjacent the female member prevent the ingress of air, moisture and water through the opening in the wall.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a perspective exploded view of a through wall connector assembly of the present invention including a sleeve assembly.

FIG. 5 is a perspective view of the through wall connector assembly of the present invention including a sleeve assembly assembled.

FIG. 6 is a cross sectional view of the through wall connector assembly including a sleeve assembly mounted in a wall.

DESCRIPTION OF THE PREFERRED EMBODIMENTS

Figure 1:
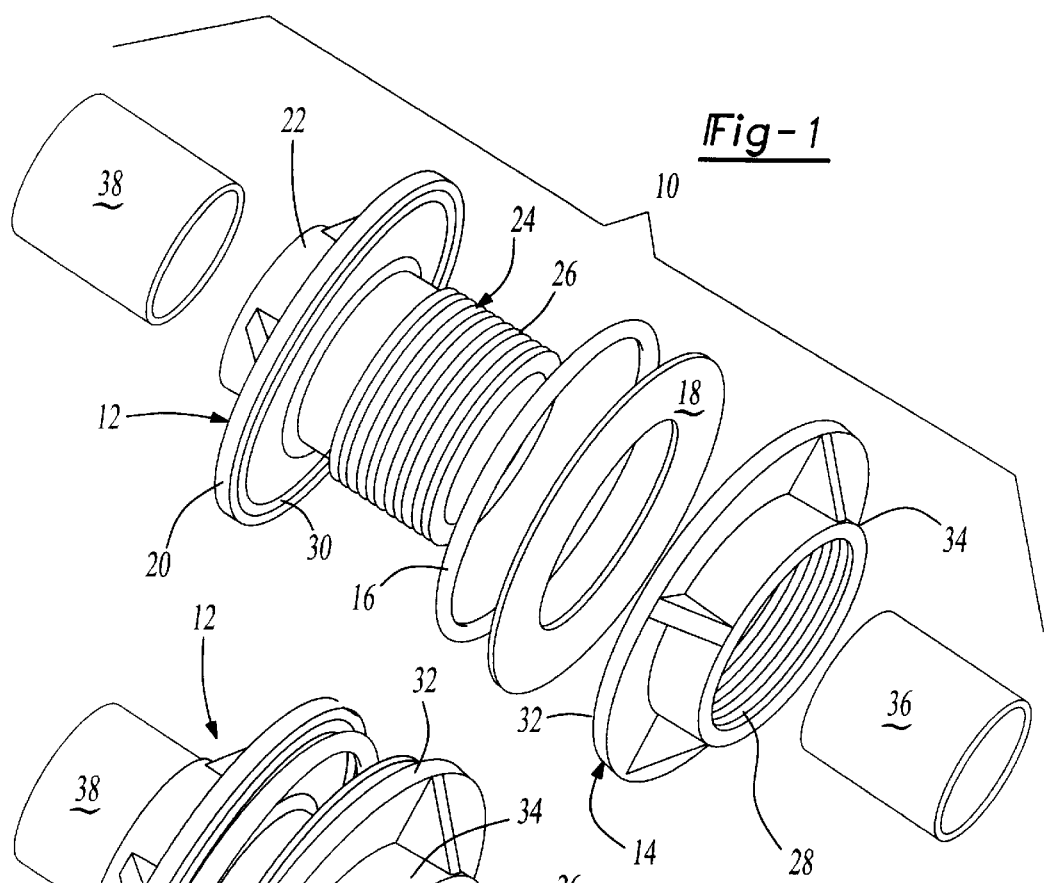
FIG. 1 is a perspective exploded view of a through wall connector assembly of the present invention.

Referring to the FIGS. 1–6, wherein like numerals indicate like or corresponding parts through out the several views, a through wall connector assembly of the present invention is shown generally at 10. It includes a male member 12, a female member 14, a first seal 16 and a second seal 18.

The male member 12 has an annular flange 20 with a nipple 22 extending from a first side of the annular flange 20 and a pipe 24 extending from a second side of the annular flange 20. The pipe 24 of the male member 12 has an externally threaded portion 26 adapted for receiving an internally threaded portion 28 of the female member 14. It should be appreciated by those of ordinary skill in the art that other means are available for interconnecting the male member 12 and female member 14, such as for example, tab snaps, adhesives, press fittings, or by welding.

The annular flange 20 of the male member 12 has a diameter which is larger than the diameter of the pipe 24 of the male member 12. In the embodiment shown, the annular flange 20 of the male member 12 has a diameter which is about twice the diameter of the pipe 24 of the male member 12. In a preferred embodiment, the annular flange 20 of the male member 12 has a groove 30 for receiving the first seal 16, which is preferably an O-ring. The seal could also be a nylon washer, adhesive, a gasket or other sealing means. The groove 30 in the annular flange 20 of the male member 12 insures proper alignment of the O-ring which is necessary to provide a proper seal.

The female member 14 has an annular flange 32 and a nipple 34 extending from a first side of the annular flange 32 of the female member 14. In the embodiment shown, the internally threaded portion 28 of the female member 14 extends through the annular flange 32 and the nipple 34 of the female member 14, but the threaded portion 28 could be shorter if desired. The second seal 18 is positioned against the second side of the annular flange 32 of the female member 14 opposite the nipple 34 of the female member 14. The second seal 18 can be a nylon washer, O-ring, or another suitable sealing material.

A first section 36 of a conduit, pipe, or line and a second section 38 of a conduit, pipe, or line are adapted to be inserted into the pipe 24 of the male member 12. The conduit, pipe, or line sections 36 and 38 might be water, sewage, or gas lines or may contain wires being extended through a wall in a building.

In use of the invention, an opening 42 of sufficient size to accommodate the pipe 24 of the male member 12 is formed in the wall 40 and the vapor barrier 44. The size of the opening 42 is determined by the size of the conduit, pipe, or line to be extended through the wall 40 and by the size of the male member 12. The internal diameter of the pipe 24 of the male member 12 should closely match the external diameters of the first section 36 and the second section 38 of the conduit, pipe, or line with the degree of closeness required determined by the means chosen to attach the first section 36 and the second section 38 to the male member 12. Typical attaching means include adhesives, threaded connections; compression fittings; or friction connections. The only care that is required in forming the opening 42 is that its diameter is less than the inside diameter of the first seal 16.

The male member 12 is inserted from the exterior side of the wall 40 into the opening 42 with the O-ring 16 in place in the groove 30. The length of the pipe 24 of the male member 12 must be of sufficient length to extend through the wall 40 and to accommodate the second seal 18 and the female member 14. The second seal 18 and the female member 14 are then mounted onto the male member 12 from the interior side of the wall 40. The female member 14 is tightened on to the male member 12 to slightly compress the first seal 16 thereby creating a seal.

The first section 36 and the second section 38 of the conduit, pipe, or line can then be attached to the male member 12. The nipple 22 of the male member 12 and the pipe 24 of the male member 12 have inside diameters that are preferably sized for receipt of the first section 36 and the second section 38. In the preferred embodiment, the first section 36 and the second section 38 are adhered to the inside the pipe 24 and the nipple 22 of the male member 12. The inside diameters of nipple 22 and the pipe 24 are adapted to closely receive the sections 36 and 38 with the inner wall of the nipple 22 and the pipe 24 being smooth. Obviously, the sections 36 and 38 could be adhered anywhere inside the male member 12. In an alternative embodiment, the inner wall of the nipple 22, the pipe 24 or both could be internally threaded and adapted to receive externally threaded portions of sections 36 and 38.

Figure 2:
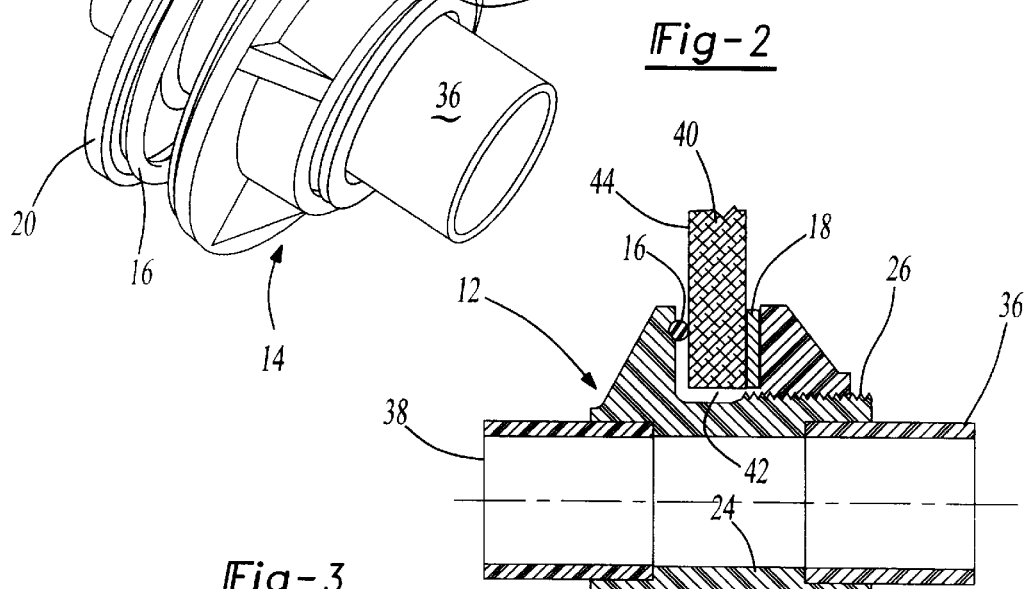
FIG. 2 is a perspective view of the through wall connector assembly of the present invention assembled.
Figure 3:
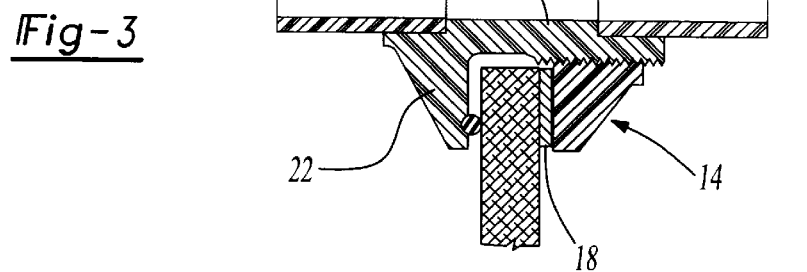
FIG. 3 is a cross sectional view of the through wall connector assembly mounted in a wall.

In a disclosed embodiment shown in FIGS. 1–3, sections 36 and 38 are passing through a wood wall 40. If the wall 40 were made of other material, such as cement block, the pipe 24 of the male member 12 would be made longer in order to pass through the block wall. In addition, several sizes of the through wall connector assembly 10 would be made to accommodate different size lines which need to be extended through the wall 40. As shown in FIG. 2, the same through wall connector assembly 10 could be used for a number of wall thicknesses depending on the length of the pipe 24.

In FIGS. 4–6 a second embodiment of the through wall connector assembly is disclosed. The second embodiment includes all of the components of the first embodiment disclosed in FIGS. 1–3 plus a sleeve assembly shown generally at 46. The sleeve assembly 46 serves to provide the opening in the wall. The sleeve assembly 46 has a sleeve portion 48 with a first annular flange 50 at one end and a second annular flange 52 at the other end. In use the sleeve assembly 46 is suspended within a set of forms (not shown) for creating a poured concrete wall 54. As will be appreciated by those skilled in the art, the sleeve assembly 46 can be positioned within the set of forms by a number of means. One such means is to slide a wall tie (not shown) through the sleeve assembly 46 when the set of forms are assembled. Once the poured concrete wall 54 has cured the wall tie and forms are removed leaving the sleeve assembly 46 embedded within the poured wall 54 as shown in FIG. 6. The first annular flange 50 and the second annular flange 52 of the sleeve assembly 46 provide a first sealing face 56 and a second sealing face 58 respectively. In selecting a sleeve assembly 46 for a particular wall thickness the sleeve assembly 46 must be sufficiently long enough to span the thickness of the wall and the sleeve portion 48 must be large enough to accommodate the through wall connector assembly 10. In addition, the diameters of the first annular flange 50 and the second annular flange 52 of the sleeve assembly 46 should preferably be larger than the diameters of the annular flange 20 of the male member 12 and the annular flange 32 of the female member 14 respectively.

Once the sleeve assembly 46 is embedded in the wall 54, the through wall connector assembly 10 is assembled in the same manner as the first embodiment. The sleeve assembly 46 is particularly necessary when the wall is made of poured concrete, bricks, or other masonry material. The surfaces of walls made of these materials are rough and porous which makes it difficult to achieve a tight seal between the wall 54 and the seals 16 and 18. The first sealing face 56 and the second sealing face 58 of the sleeve assembly 46 provide smooth surfaces which allow the first seal 16 and the second seal 18 respectively to seal around the opening. In a wall made of bricks or other masonry material the sleeve assembly 46 can be incorporated in the wall as it is assembled.

In the preferred embodiment, the through wall connector assembly 10 and the sleeve assembly are made of PVC material. Preferably, the male member 12 and the female member 14 are molded as unitary elements. If desired, the male member 12 and the female member 14 could be made of other materials, such as for example, iron, copper, galvanized metal, etc.

It should be appreciated that the above is a description of a preferred embodiment. Those of ordinary skill in the art will be aware of variations that are within the scope of this invention. In view of this, the present invention should not be limited except as provided in the following claims.

We claim:

1. A through wall connector assembly for providing a seal about an opening in a wall to allow for a sealed connection of separate lines through the opening in the wall wherein said assembly comprises:

a male member adapted to extend from one side of the wall through the opening in the wall to the other side of the wall, said male member comprising a single unit having an annular flange with a diameter larger than the diameter of the opening in the wall, a nipple extending from a first side of said annular flange, and a pipe extending from an opposed second side of said annular flange and adapted to receive the separate lines to be extended through the wall, one of the lines being inserted through said nipple from the one side of the wall and the other line being inserted through said pipe from the other side of the wall;

a female member for attachment to said male member to secure said male member and said female member to the wall, said female member being attached to said male member from the other side of the wall;

a first sealing means adjacent said male member and a second sealing means adjacent said female member, said first sealing means and said second sealing means having inner diameters larger than the diameter of the opening and sealing around the opening in the wall.

2. A through wall connector assembly as set forth in claim 1, wherein said annular flange includes at least one groove in said second side of said annular flange for receiving said first sealing means.

3. A through wall connector assembly as set forth in claim 1, wherein said first sealing means comprises an O-ring.

4. A through wall connector assembly as set forth in claim 1, wherein said means for attachment of said female member to said male member comprises an externally threaded portion of said pipe of said male member adapted to receive an internally threaded portion of said female member.

5. A through wall connector assembly as set forth in claim 1, wherein said female member comprises a single unit having an annular flange with a diameter larger than the diameter of the opening and a nipple, said nipple extending from a first side of said annular flange.

6. A through wall connector assembly as set forth in claim 1, wherein said second sealing means comprises a washer.

7. A through wall connector assembly as set forth in claim 1, wherein said male member includes at least one internally threaded portion adapted to receive an externally threaded portion of at least one of the lines.

8. A through wall connector assembly as set forth in claim 1, wherein the lines are connected to said male member by an adhesive.

9. A through wall connector assembly as set forth in claim 1, wherein said male member and said female member are made of PVC material.

10. A through wall connector assembly as set forth in claim 1, wherein the opening in the wall is provided by a sleeve assembly embedded in the wall:
    said sleeve assembly comprising a sleeve portion having a first annular flange providing a first sealing face and a second annular flange providing a second sealing face; said sleeve assembly being adapted to span the thickness of the wall thereby providing an opening in the wall;
    said male member adapted to extend through said sleeve assembly from one side of the wall to the other side of the wall;
    said first sealing means and said second sealing means being adjacent said first sealing face and said second sealing face respectively.

11. A through wall connector assembly for providing a substantially water-tight and air-tight seal around an opening in a wall to allow for extension of a line through the opening in the wall wherein said assembly comprises:
    a male member, a female member, a first sealing means, and a second sealing means;
    said male member comprising a single unit having a first annular flange with a diameter larger than the diameter of the opening, a first nipple extending from a first side of said first annular flange, a pipe extending from an opposing second side of said first annular flange, and means for receiving a first section and a second section of the line to be extended through the wall;
    said female member comprising a single unit having a second annular flange with a diameter larger than the diameter of the opening, a second nipple, and means for attachment to said male member, said second nipple extending from a first side of said second annular flange, said means for attachment to said male member securing said male member and said female member to opposite sides of the wall;
    said first sealing means being mounted about said pipe of said male member between said second side of said first annular flange of said male member and one side of the wall;
    said second sealing means being mounted on said pipe of said male member between said second annular flange of said female member and the other side of the wall; and
    said first sealing means and said second sealing means sealing around the opening in the wall.

12. A through wall connector assembly as set forth in claim 11, wherein said first annular flange includes at least one groove in said second side of said first annular flange, said groove receiving said first sealing means.

13. A through wall connector assembly as set forth in claim 11, wherein said first sealing means comprises an O-ring.

14. A through wall connector assembly as set forth in claim 11, wherein said means for attachment of said female member to said male member comprises an externally threaded portion of said pipe of said male member adapted to receive an internally threaded portion of said female member.

15. A through wall connector assembly as set forth in claim 11, wherein said second sealing means comprises a washer.

16. A through wall connector assembly as set forth in claim 11, wherein said means for receiving the first section and the second section of the line in said male member comprises at least one internally threaded portion of said male member adapted to receive an externally threaded portion on at least one of the sections of the line.

17. A through wall connector assembly as set forth in claim 11, wherein said means for receiving the first section and the second section of the line in said male member comprises an adhesive, said adhesive adhering at least one of the sections to the male member.

18. A through wall connector assembly as set forth in claim 11, wherein said male member and said female member are made of PVC material.

19. A through wall connector assembly as set forth in claim 11, wherein the opening in the wall is provided by a sleeve assembly embedded in the wall:
    said sleeve assembly comprising a sleeve portion having a first annular flange providing a first sealing face and a second annular flange providing a second sealing face; said sleeve assembly being adapted to span the thickness of the wall thereby providing an opening in the wall;
    said male member adapted to extend through said sleeve assembly from one side of the wall to the other side of the wall;
    said first sealing means and said second sealing means being adjacent said first sealing face and said second sealing face respectively.

* * * * *